United States Patent
Moon et al.

(10) Patent No.: US 10,723,642 B2
(45) Date of Patent: *Jul. 28, 2020

(54) WATER TREATMENT DEVICE

(71) Applicant: COWAY CO., LTD., Chungcheongnam-do (KR)

(72) Inventors: Hyoung-Min Moon, Seoul (KR); Sung-Han Yun, Seoul (KR); Won-Il Joo, Seoul (KR); Tae-Seong Kwon, Seoul (KR); Sang-Hyeon Kang, Seoul (KR)

(73) Assignee: Coway Co., Ltd (KR)

( * ) Notice: Subject to any disclaimer, the term of this patent is extended or adjusted under 35 U.S.C. 154(b) by 14 days.

This patent is subject to a terminal disclaimer.

(21) Appl. No.: 15/781,956

(22) PCT Filed: Dec. 6, 2016

(86) PCT No.: PCT/KR2016/014238
§ 371 (c)(1),
(2) Date: Jun. 6, 2018

(87) PCT Pub. No.: WO2017/099450
PCT Pub. Date: Jun. 15, 2017

(65) Prior Publication Data
US 2018/0370831 A1 Dec. 27, 2018

(30) Foreign Application Priority Data
Dec. 8, 2015 (KR) ........................ 10-2015-0174407

(51) Int. Cl.
*C02F 9/00* (2006.01)
*B01D 63/02* (2006.01)
(Continued)

(52) U.S. Cl.
CPC ................ *C02F 9/00* (2013.01); *B01D 35/06* (2013.01); *B01D 37/04* (2013.01); *B01D 37/043* (2013.01);
(Continued)

(58) Field of Classification Search
CPC .... C02F 9/00; C02F 1/44; C02F 1/467; C02F 1/441; C02F 1/003; C02F 2301/043;
(Continued)

(56) References Cited

U.S. PATENT DOCUMENTS 3,550,782 A * 12/1970 Veloz ..................... B01D 61/08
210/192
4,752,389 A * 6/1988 Burrows ................ B01D 61/08
210/181
(Continued)

FOREIGN PATENT DOCUMENTS

JP 2003071436 3/2003
KR 1020110127595 11/2011
(Continued)

OTHER PUBLICATIONS

Korean Office Action dated Aug. 24, 2018 issued in counterpart application No. 10-2015-0174407, 9 pages.
(Continued)

*Primary Examiner* — Joseph W Drodge
(74) *Attorney, Agent, or Firm* — The Farrell Law Firm, P.C.

(57) ABSTRACT

The present invention provides a water treatment device comprising: a filtering unit for filtering raw water; a storing unit comprising a first chamber for storing purified water, which has passed through at least a predetermined number of filters provided in the filtering unit and thus has been filtered, and a second chamber, the volume of which changes according to the volume change of the first chamber; an
(Continued)

extraction unit installed to provide the user with the purified water that has been filtered; an sterilizing water supply unit for supplying sterilizing water in order to sterilize/disinfect the storing unit; and a control unit for controlling the driving of the sterilizing water supply unit and the opening/closing of a channel for supplying the sterilizing water.

16 Claims, 8 Drawing Sheets

(51) Int. Cl.
| | |
|---|---|
| *C02F 1/00* | (2006.01) |
| *C02F 1/44* | (2006.01) |
| *B01D 69/08* | (2006.01) |
| *B01D 35/06* | (2006.01) |
| *B01D 37/04* | (2006.01) |
| *B01D 61/02* | (2006.01) |
| *C02F 1/467* | (2006.01) |
| *C02F 1/28* | (2006.01) |

(52) U.S. Cl.
CPC .......... *B01D 37/046* (2013.01); *B01D 61/02* (2013.01); *B01D 61/025* (2013.01); *B01D 63/02* (2013.01); *B01D 69/08* (2013.01); *C02F 1/003* (2013.01); *C02F 1/44* (2013.01); *C02F 1/441* (2013.01); *C02F 1/467* (2013.01); *B01D 2311/14* (2013.01); *B01D 2311/2626* (2013.01); *B01D 2311/2649* (2013.01); *B01D 2311/2684* (2013.01); *C02F 1/008* (2013.01); *C02F 1/283* (2013.01); *C02F 1/4672* (2013.01); *C02F 2201/005* (2013.01); *C02F 2209/005* (2013.01); *C02F 2209/03* (2013.01); *C02F 2209/40* (2013.01); *C02F 2301/043* (2013.01); *C02F 2303/04* (2013.01); *C02F 2307/10* (2013.01)

(58) Field of Classification Search
CPC ...... C02F 1/283; C02F 1/008; C02F 2209/03; C02F 2201/005; C02F 2209/40; C02F 1/4672; C02F 2307/10; C02F 2303/04; C02F 2209/005; C02F 1/46; C02F 1/4674; B01D 35/06; B01D 61/02; B01D 37/04; B01D 69/08; B01D 61/025; B01D 37/043; B01D 37/046; B01D 63/02; B01D 2311/2684; B01D 2311/2649; B01D 2311/2626; B01D 2311/14; B01D 36/00; B01D 36/02; B01D 36/04; B01D 61/04; B01D 61/18; B01D 61/20; B01D 61/22; B01D 2311/06; B01D 2311/10; B01D 2311/103; B01D 2311/106; B01D 2311/2692; B01D 2311/2321; B01D 2311/00; B01D 2311/02; B01D 2311/16; B01D 2311/168; B01D 2311/20; B01D 2311/40; B01D 61/63; B01D 2321/00; B01D 2321/02; B01D 2321/10; B01D 2321/16; B01D 2321/168; B01D 2321/20; B01D 2321/40; B67D 2210/0001; B67D 2210/00013; B67D 2210/00018; B67D 2210/00099; B67D 2210/00118
USPC ....... 210/106, 175, 192, 257.2, 259, 321.69, 210/636, 748.17, 652; 222/146.1, 189.06, 222/189.08, 189.11
See application file for complete search history.

(56) References Cited

U.S. PATENT DOCUMENTS

| | | | | |
|---|---|---|---|---|
| 4,784,771 | A * | 11/1988 | Wathen | A61M 1/1656 210/126 |
| 5,076,913 | A * | 12/1991 | Miller | B01D 61/025 210/134 |
| 5,256,279 | A * | 10/1993 | Voznick | B01D 17/0214 210/86 |
| 5,547,584 | A * | 8/1996 | Capehart | C02F 1/008 210/241 |
| 5,997,738 | A * | 12/1999 | Lin | B01D 61/025 210/102 |
| 10,266,441 | B2 * | 4/2019 | Lee | B01D 61/025 |
| 2002/0040867 | A1 * | 4/2002 | Conrad | C02F 1/78 210/97 |
| 2006/0226081 | A1 * | 10/2006 | Lupton | B01D 61/025 210/652 |
| 2007/0256977 | A1 | 11/2007 | Schmitt | |
| 2009/0077992 | A1 * | 3/2009 | Anderson | B01D 1/02 62/291 |
| 2011/0120921 | A1 * | 5/2011 | Kim | B67D 1/0004 210/97 |
| 2013/0062219 | A1 | 3/2013 | Lee et al. | |
| 2017/0014769 | A1 | 1/2017 | Kwon et al. | |

FOREIGN PATENT DOCUMENTS

| | | |
|---|---|---|
| KR | 1020130092139 | 8/2013 |
| KR | 1020140081431 | 7/2014 |
| KR | 1020140085826 | 7/2014 |
| WO | WO 2015/126107 | 8/2015 |

OTHER PUBLICATIONS

European Search Report dated Sep. 11, 2018 issued in counterpart application No. 16873315.2-1101, 8 pages.

* cited by examiner

WATER TREATMENT DEVICE

PRIORITY

This application is a National Phase Entry of International Application No. PCT/KR2016/014238, which was filed on Dec. 6, 2016, and claims priority to Korean Patent Application No. 10-2015-0174407, which was filed on Dec. 8, 2015, the content of each of which is incorporated herein by reference.

TECHNICAL FIELD

The present disclosure relates to a water treatment device, and more particularly, to a water treatment device capable of extracting purified water by the pressure of raw water.

BACKGROUND ART

In general, a water treatment device is a device for treating incoming water, and discharging water externally to supply drinking water to a user.

Such a water treatment device may be a water purifier including one or more water filters to filter incoming water, and to supply filtered water to a user. In addition to the water purifier, there may also be provided a gasogene providing carbon dioxide to incoming water to be supplied to a user, or a water ionizer which electrolyzes incoming water into alkaline water and acidic water to be supplied to a user.

Such a water treatment device may include a water tank in which filtered purified water may flow and is stored.

In the water tank, the purified water may be stored at atmospheric pressure, thereby limiting an extraction position of the purified water. For example, There may be a problem in which water stored in the water tank may be discharged externally, only if an extraction unit such as a cock or a faucet, connected to the water tank to discharge the water stored in the water tank, should be disposed lower than a water level of the water tank.

Further, conventional water treatment devices may not be able to sufficiently cope with contamination of a water tank or an extraction member.

DISCLOSURE

Technical Problem

An aspect of the present disclosure may provide a water treatment device sterilizing and/or disinfecting a storage unit to solve at least a portion of the above problems occurring in the prior art. Particularly, an aspect of the present disclosure aims to enable sterilization and/or disinfection by the pressure of raw water, in a water purifier extracting purified water by the pressure of raw water.

An aspect of the present disclosure may provide a water treatment device sterilizing and/or disinfecting a channel between a storage unit and an extraction unit, as well as a storage unit.

An aspect of the present disclosure may provide a water treatment device in which sterilization and/or disinfection of an extraction unit may be separately performed.

An aspect of the present disclosure may provide a water treatment device discharging sterilizing water to a drain line, after sterilization of an extraction unit is completed.

In addition, an aspect of the present disclosure may provide a water treatment device extracting purified water by the pressure of raw water.

Further, an aspect of the present disclosure may provide a water treatment device in which a position (height) of an extraction unit is not limited.

In addition, an aspect of the present disclosure may provide a water treatment device easily discharging water stored in a storage unit.

Technical Solution

According to an aspect of the present disclosure, a water treatment device includes: a filtering unit filtering raw water, a storage unit comprising a first chamber for storing purified water, having passed through at least a portion of filters provided in the filtering unit and thus filtered, and a second chamber, the volume of which changes according to the volume change of the first chamber, an extraction unit installed to provide a user with the purified water, having been filtered, a sterilizing water supply unit for supplying sterilizing water to the storage unit to sterilize the storage unit, and a control unit for controlling driving of the sterilizing water supplying unit, and opening and closing of a channel for supplying the sterilizing water.

The control unit may be configured to supply sterilizing water to a channel connecting the storage unit and the extraction unit.

The control unit may be configured to supply sterilizing water to the storage unit in a sterilization mode of the storage unit, and to drain sterilizing water contained in the storage unit via the extraction unit.

According to an aspect of the present disclosure, a water treatment device includes: a filtering unit for filtering raw water, a storage unit comprising a first chamber for storing purified water, having passed through at least a portion of filters provided in the filtering unit and thus filtered, and a second chamber, the volume of which changes according to the volume change of the first chamber, an extraction unit installed to provide a user with the purified water, having been filtered, a sterilizing water supply unit for supplying sterilizing water to the extraction unit to sterilize the extraction unit, and a control unit for controlling driving of the sterilizing water supplying unit, and opening and closing of a channel for supplying the sterilizing water.

The sterilizing water supply unit may be installed in a sterilizing water line branched from a filtering unit line provided in the filtering unit, such that water passed through at least a portion of the filters provided in the filtering unit may flow.

The filtering unit line may be connected to the first chamber via a purified water supply line such that purified water filtered in the filtering unit may flow into the first chamber, and the sterilizing water line may be connected to the purified water supply line such that the sterilizing water generated by the sterilizing unit generating unit may flow into the first chamber.

The purified water supply line may be connected to the extraction unit, and a flow rate sensor may be installed in the purified water supply line.

At least one of a purified water extraction line for supplying purified water at room temperature contained in the storage unit to the extraction unit, a cold water extraction line for cooling purified water at room temperature contained in the storage unit and supplying the purified water to the extraction unit, and a hot water extraction line for heating purified water contained in the storage unit and supplying the purified water to the extraction unit, may be provided between the storage unit and the extraction unit, and the control unit may supply sterilizing water to at least one channel of the purified water extraction line, the cold water extraction line and the hot water extraction line.

The control unit may control the opening and closing of the channel, such that a purification mode for storing purified water in the storage unit and an extraction mode for extracting purified water stored in the storage unit via the extraction unit are realized.

The storage unit may further include: a housing having an internal space formed therein for storing the purified water filtered by the filtering unit; and a partition member dividing an internal space of the housing into a first chamber and a second chamber, the partition member being deformed according to volume changes of the first chamber and the second chamber.

Purified water filtered by passing through at least a portion of the filtering unit may flow into the first chamber, and raw water may flow into the second chamber. Alternatively, purified water filtered by passing through at least a portion of the filtering unit may flow into the first chamber, and water having a degree of filtration lower than that of the purified water supplied to the first chamber may flow into the second chamber. Further, the filtering unit may include a reverse osmosis filter, purified water filtered by passing through the reverse osmosis filter flowing into the first chamber, and water filtered by passing through a filter located at a front stage of the reverse osmosis filter, or water not filtered by the reverse osmosis filter flowing into the second chamber.

A backflow prevention valve may be installed on a channel connecting the reverse osmosis filter and the first chamber of the storage unit.

A first high pressure shut-off switch may be installed on a channel connecting the reverse osmosis filter and the first chamber of the storage unit to output a signal, when the pressure is equal to or higher than a predetermined pressure.

A chamber water supply line into which raw water or water filtered through at least a portion of the filter provided in the filtering unit flows in the direction of the second chamber, a chamber water flow line connecting the chamber water supply line and the second chamber, and a drain line connected to the chamber water flow line such that water discharged through the chamber water flow line from the second chamber is discharged externally, may be included.

A second high pressure shut-off switch for outputting a signal when the pressure is equal to or higher than a predetermined pressure may be provided in the chamber water flow line.

Domestic water discharged via the domestic water discharge line, which does not pass through the reverse osmosis filter, may be discharged to the drain line via the chamber water flow line.

A drain connection line may be installed between the extraction unit and the drain line such that water discharged from the extraction unit is selectively discharged to the drain line.

Advantageous Effects

According to an aspect of the present disclosure, it is possible to obtain an effect that sterilization and/or disinfection may be performed by the pressure of raw water, in the water purifier extracting purified water by the pressure of raw water. Particularly, according to an aspect of the present disclosure, a water treatment device having a storage unit separated into first and second chambers, and capable of extracting purified water by the pressure of raw water using the volume change of the first chamber and the second chamber may obtain effects that the storage unit is sterilized and/or disinfected.

According to an aspect of the present disclosure, the sterilizing water contained in the storage unit may be discharged via the extraction unit after the sterilization and/or disinfection of the storage unit, whereby the channel between the storage unit and the extraction unit may be sterilized and/or disinfected.

According to an aspect of the present disclosure, since the sterilization and/or disinfection of the extraction unit may be performed separately from the sterilization and/or disinfection of the storage unit, the sterilization and/or disinfection of the extraction unit may be easily performed in a short time.

According to an aspect of the present disclosure, a drain connection line may be provided to discharge sterilizing water after sterilization and/or disinfection of the extraction unit through a drain line, thereby facilitating disinfection without using a separate container for discharging sterilizing water. In particular, since a separate container for discharging sterilizing water is not required, an automatic sterilization operation may be performed without user involvement.

According to an aspect of the present disclosure, since the storage and extraction of the purified water are performed using the volume change of the first chamber and the second chamber, the purified water, even in the water purifier employing the reverse osmosis filter, may be extracted by using pressure of raw water, such that there is no limitation on the height of the extraction unit.

BEST MODE FOR INVENTION

Figure 1:
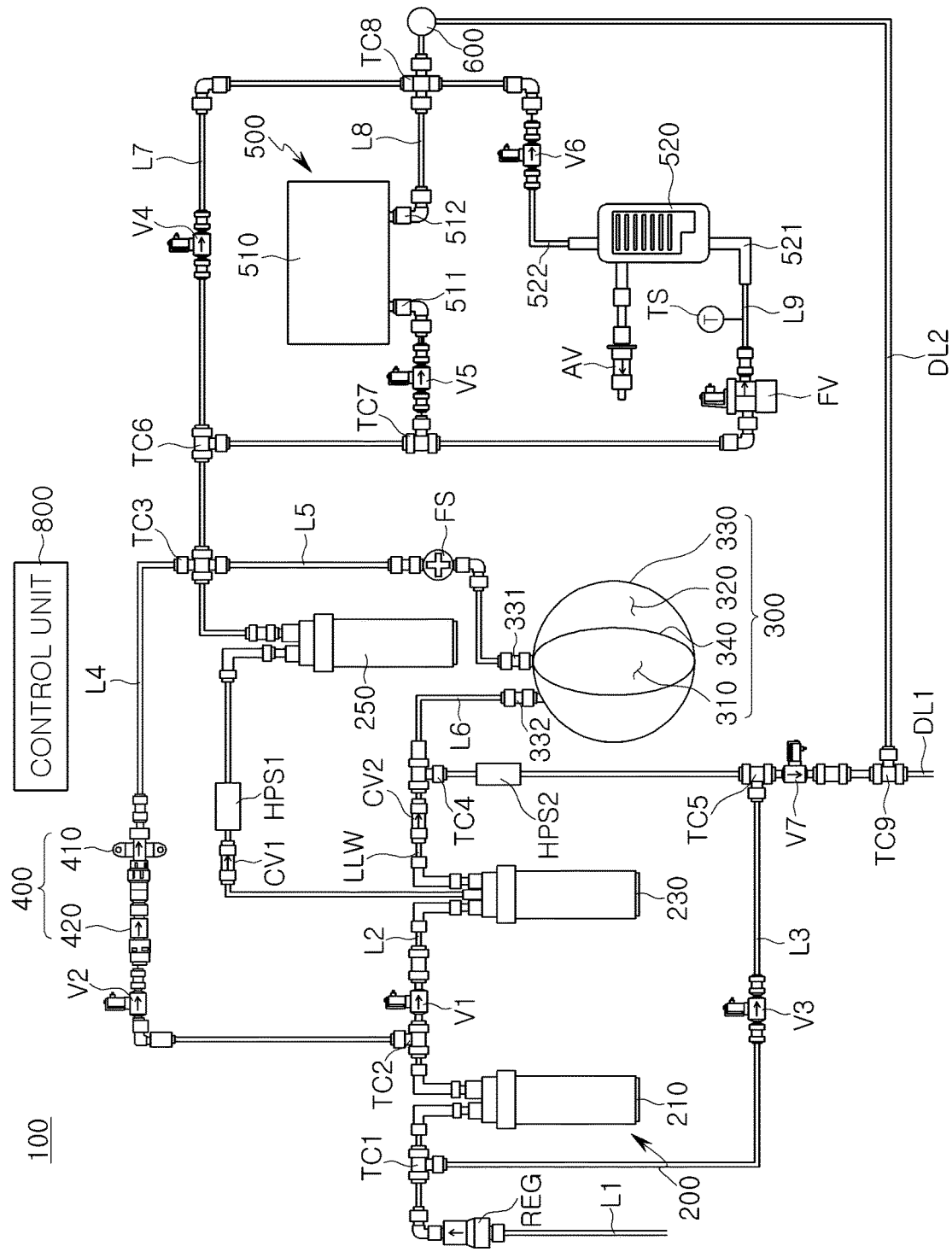
FIG. 1 is a water pipe diagram of a water treatment device according to an aspect of the present disclosure.

Hereinafter, exemplary aspects of the present disclosure will be described with reference to the accompanying drawings. The aspects of the present disclosure may be modified to have various other forms, and the scope of the present disclosure may not be limited to the aspects described below. Further, the aspects of the present disclosure may be provided to more fully explain the present disclosure to those skilled in the art. The shape and size of the elements in the drawings may be exaggerated for clarity.

Also, in this specification, the singular forms "a," "an," and "the" may include plural referents, unless the context clearly dictates otherwise, and like reference numerals may be referred to the same or corresponding components throughout the specification.

Hereinafter, various aspects of the present disclosure will be described with reference to the drawings.

As illustrated in FIGS. 1 to 8, a water treatment device 100 according to an aspect may include a filtering unit 200, a storage unit 300, an extraction unit 600, a sterilizing water supply unit 400, and a control unit 800, and, optionally, may be configured to include a water temperature changing unit 500.

Specifically, a water treatment device 100 according to one aspect may include a filtering unit 200 filtering raw water, a storage unit 300 including a first chamber 310 for storing purified water, having passed through at least a portion of filters provided in the filtering unit 200 and thus filtered, and a second chamber 320, the volume of which changes according to the volume change of the first chamber 310, an extraction unit 600 installed to provide a user with the purified water, having been filtered, a sterilizing water supply unit 400 for supplying sterilizing water to the storage unit 300 to sterilize and/or disinfect the storage unit 300, and a control unit 800, for controlling driving of the sterilizing water supplying unit 400, and opening and closing of a channel for supplying the sterilizing water.

The sterilizing water supply unit 400 provided in the water treatment device 100 according to an aspect may be configured to supply the sterilizing water to the extraction unit 600 to sterilize the extraction unit 600.

Figure 6:
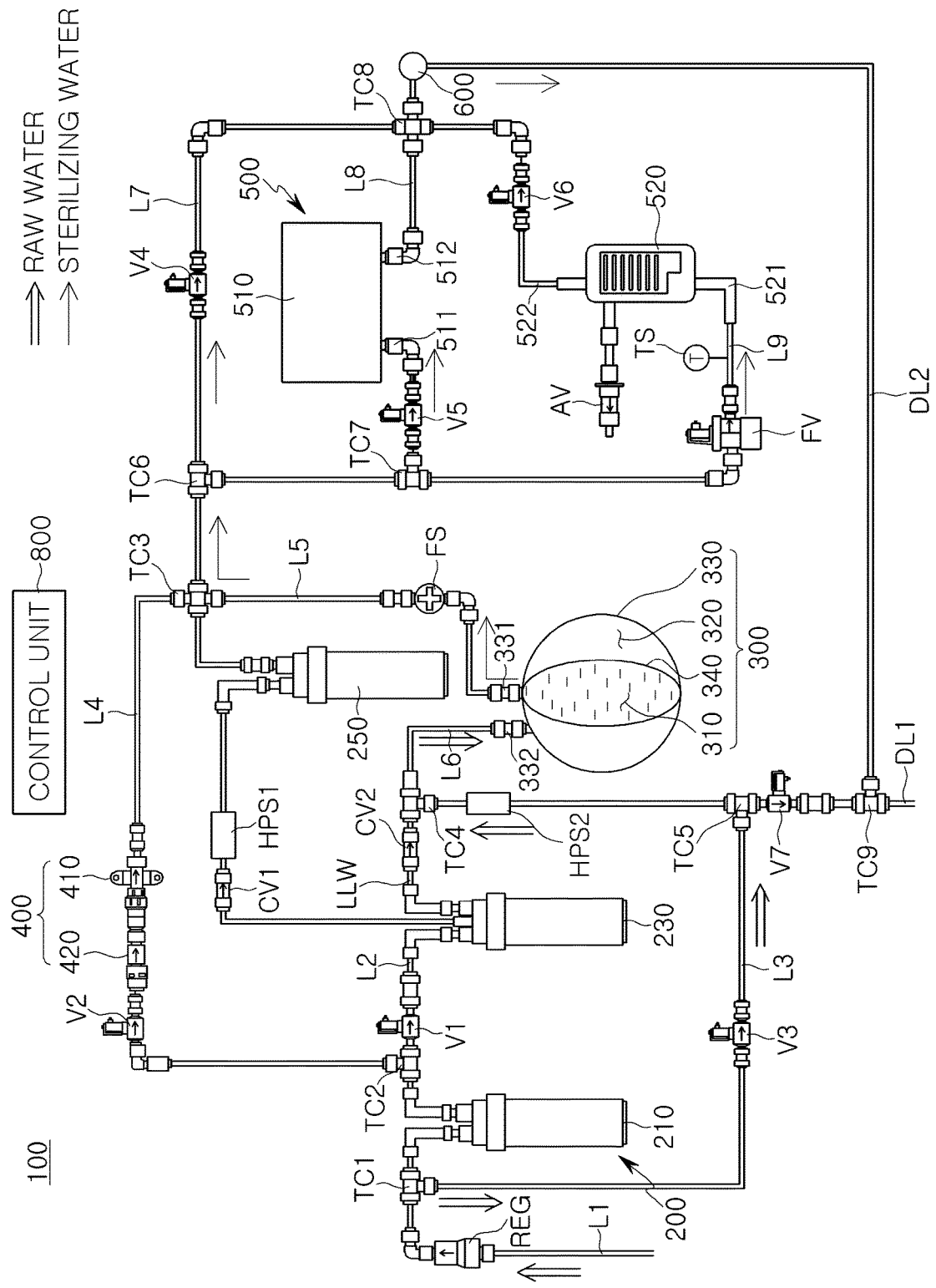
FIG. 6 is a water pipe diagram illustrating a channel at the time of discharging sterilizing water after tank sterilization of a water treatment device illustrated in FIG. 1.
Figure 7:
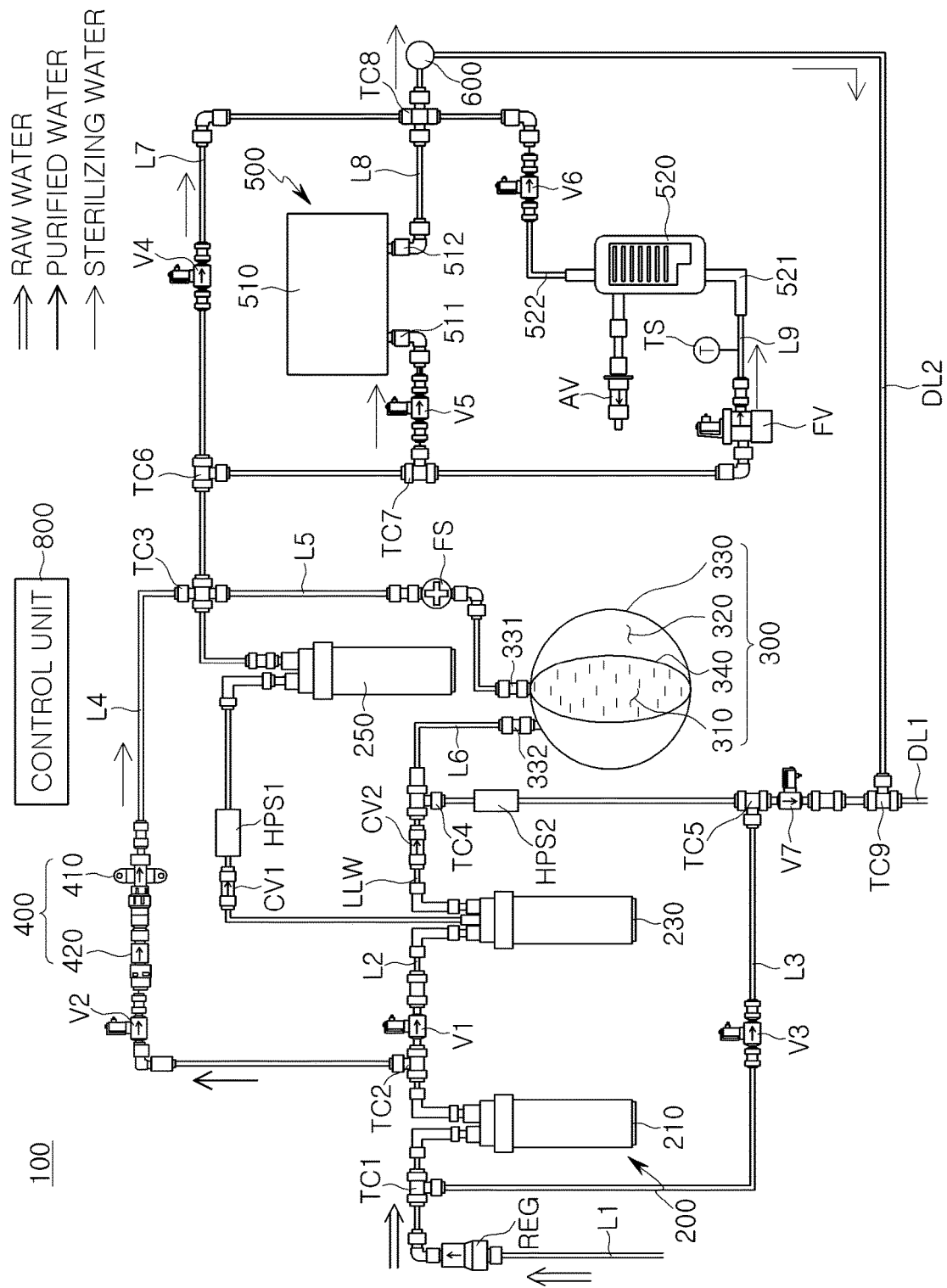
FIG. 7 is a water pipe diagram illustrating a channel at the time of sterilizing an extraction unit of a water treatment device illustrated in FIG. 1.
Figure 8:
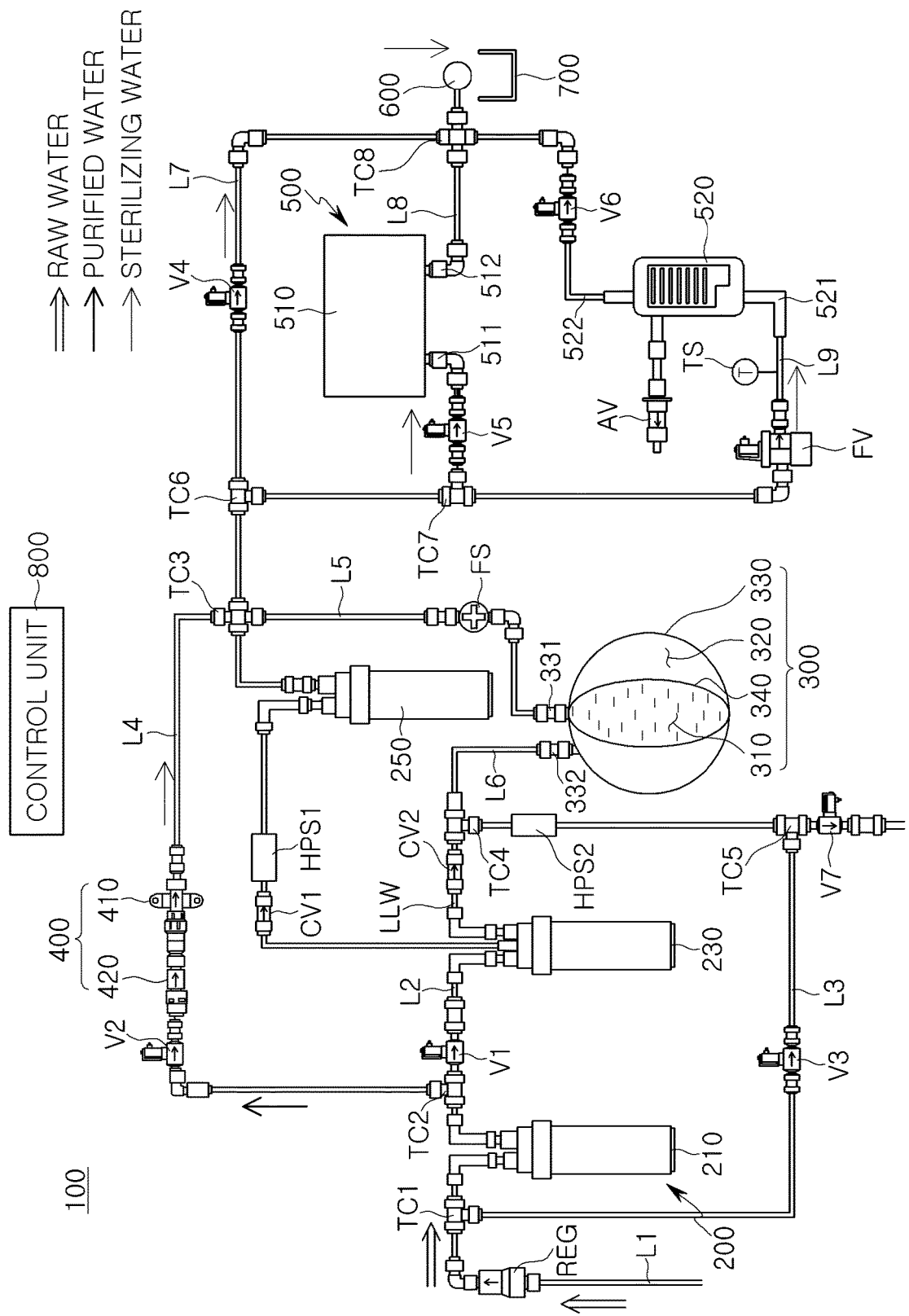
FIG. 8 is a water pipe diagram illustrating a channel at the time of sterilizing an extraction unit according to another aspect of the present disclosure.

FIG. 1 is a water pipe diagram of a water treatment device 100 according to an aspect, FIGS. 2 to 7 are water pipe diagrams illustrating channels in various states of a water treatment device 100 illustrated in FIG. 1, and FIG. 8 is a water pipe diagram for a modification of a water treatment device 100 illustrated in FIG. 1.

A configuration of a filtering unit 200, a storage unit 300, a extraction unit 600, a sterilizing water supply unit 400, a control unit, and a water temperature changing unit 500 included in a water treatment device 100 according to an aspect will be described below.

[Filtering Unit 200]

A filtering unit 200 may include one or more filters to filter raw water obtained via a raw water line L1.

As illustrated in FIGS. 1 to 8, a filtering unit 200 may include a pretreatment filter 210, a main treatment filter 230, and a post-treatment filter 250.

Specifically, the pretreatment filter 210 may include one or more filters, and may include at least one of a sediment filter and a pre-carbon filter as an example. In this case, the pretreatment filter 210 may be configured as a composite filter having two or more functions as illustrated in FIG. 1, but two filters may be also provided as separate cartridges.

The sediment filter may supply raw water from the raw water line L1, and may adsorb and remove relatively large floating particulate material, sand, and other solid substances contained in the raw water. In addition, the pre-carbon filter may be supplied with water that passes through a sediment filter, and may remove chemicals harmful to human bodies, such as volatile organic compounds, carcinogens, synthetic detergents, insecticides, or the like, and residual chlorines, for example, HOCl or ClO components, by an adsorption method of activated carbon.

In addition, the main treatment filter 230 may be configured as a reverse osmosis filter (RO filter, reverse osmosis membrane filter) as an example.

Such a reverse osmosis filter may provide filtered water by a pre-carbon filter to remove heavy metals and other metal ions contained in water, and fine organic and inorganic substances, such as bacteria, through a membrane having fine pores. A drain line DL1 for discharging domestic water, i.e., waste water (total dissolved solids TDS in a case of domestic water is high and is conventionally referred to as "concentrated water"), generated during filtration of raw water, may be connected to the reverse osmosis filter, and a domestic water valve (concentration valve) CV2 as a channel resistance means for adjusting the discharge amount of domestic water may be installed in the drain line DL1. The domestic water valve CV2 may serve as a resistance valve to apply pressure of raw water to the reverse osmosis filter 230, and may form a narrower channel than the channel through which the filtered water is discharged to limit discharge of the domestic water.

As the post-treatment filter 250, a post-carbon filter may be used. Such a post-carbon filter may be a carbon filter using coal, wood or coconut oil as a raw material, using an activated carbon adsorption method, and may adsorb and remove unpleasant tastes, odors and colors of filtered water through a reverse osmosis filter.

The type, the number and the order of the filters provided in the filtering unit 200 may be changed according to a filtration method of the water treatment device or a filtration performance required for the water treatment device. Accordingly, the present disclosure is not limited to structures of filtering units 200 illustrated in FIGS. 1 to 8.

For example, as the main treatment filter 230, a hollow fiber membrane filter or a nanotrap filter may be provided instead of the reverse osmosis filter. Such a hollow fiber membrane filter may be a porous filter having a pore size of several tens to several hundred nanometers (nm), and may remove contaminants in water through numerous micropores distributed on the membrane surface.

For example, FIGS. 1 to 8 may illustrate cases in which the reverse osmosis filter is used as the main treatment filter 230. The main treatment filter 230 may be a hollow fiber membrane filter or a nanotrap filter. In this case, a domestic water discharge line LLW to be described later may be unnecessary, and thus may be unused.

Hereinafter, for convenience of description of the aspects illustrated in FIGS. 1 to 8, a description will be made of a case in which the main treatment filter 230 is an reverse osmosis filter, and the same reference numeral '230' will be used as the reverse osmosis filter. The main treatment filter 230 is not limited to the reverse osmosis filter as described above.

Further, known functional filters may be used, in addition to the above-described post-carbon filter, as the post-treatment filter 250.

Figure 2:
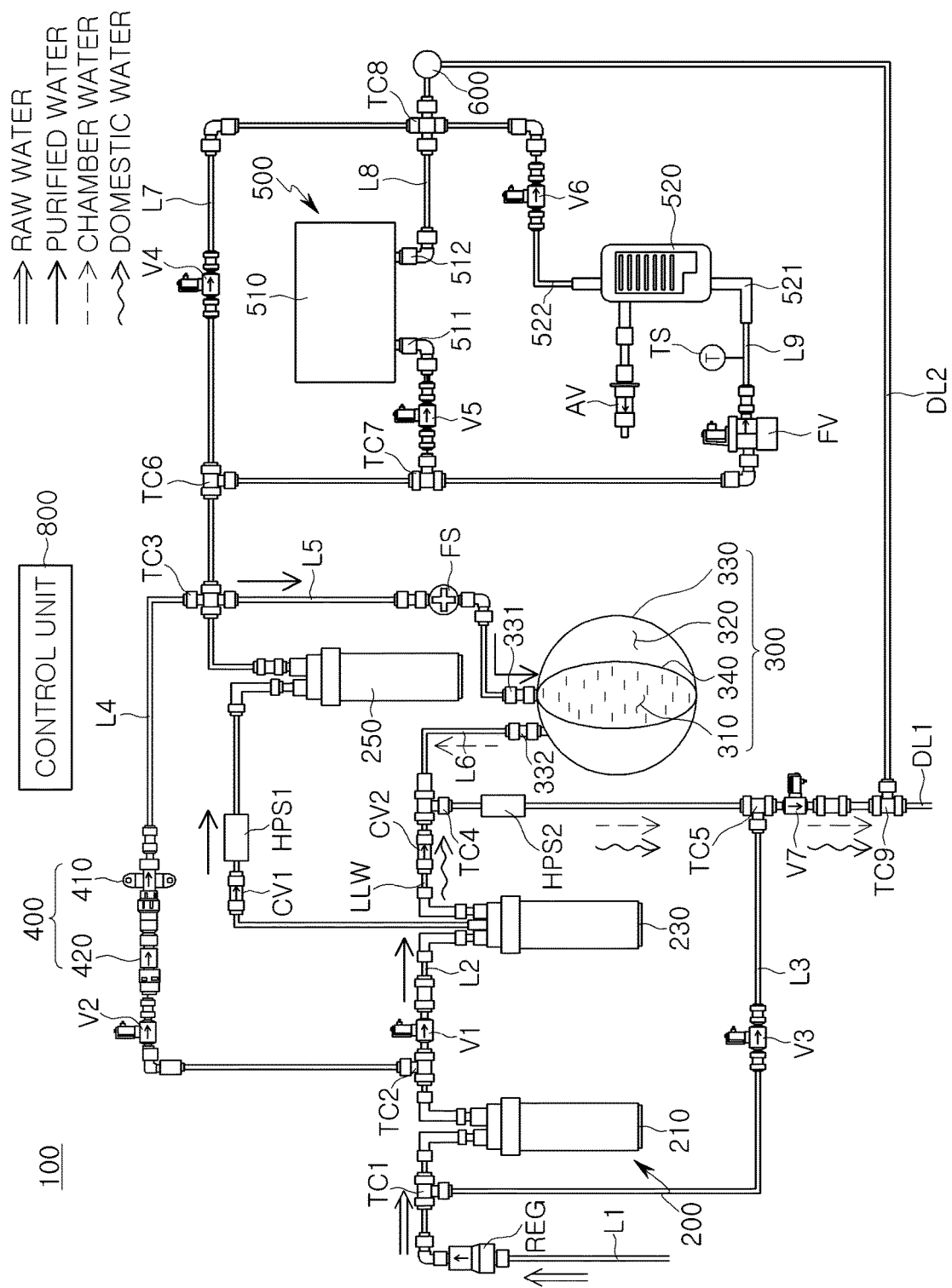
FIG. 2 is a water pipe diagram illustrating a channel at the time of storing purified water of a water treatment device illustrated in FIG. 1.

Referring to FIGS. 1 and 2, raw water flowing via the raw water line L1 may be filtered through a pretreatment filter 210, and may be supplied to the reverse osmosis filter 230 via a pressure reducing valve REG installed in the raw water line L1. When a supply pressure of the raw water from the raw water line L1 is higher than a predetermined pressure, the pressure reducing valve REG may reduce pressure of raw water and supply the reduced pressure raw water to the filtering unit 200. As illustrated in FIGS. 1 to 8, a pressure reducing valve REG may be provided at a front stage of the pretreatment filter 210. A position of the pressure reducing valve REG is not limited thereto, and may be disposed between the pretreatment filter 210 and the reverse osmosis filter 230.

A purified water supply valve V1 for opening and closing a channel of a filtering unit line L2 may be installed in the first filtering unit line L2 of the filtering unit 200 to store purified water in the storage unit 300.

On the other hand, the purified water filtered through the pretreatment filter 210 may be supplied to the reverse osmosis filter 230. The reverse osmosis filter 230 may be connected to a line for discharging filtered water, and the domestic water discharge line LLW for discharging domestic water generated during filtration of raw water.

The purified water in the reverse osmosis filter 230 may be further filtered in the post-treatment filter 250, and then supplied to a first chamber 310 of the storage unit 300 via a purified water supply line L5. The post-treatment filter 250 is not essential, and may be omitted, or may be provided according to a performance of the water treatment device 100.

Figure 3:
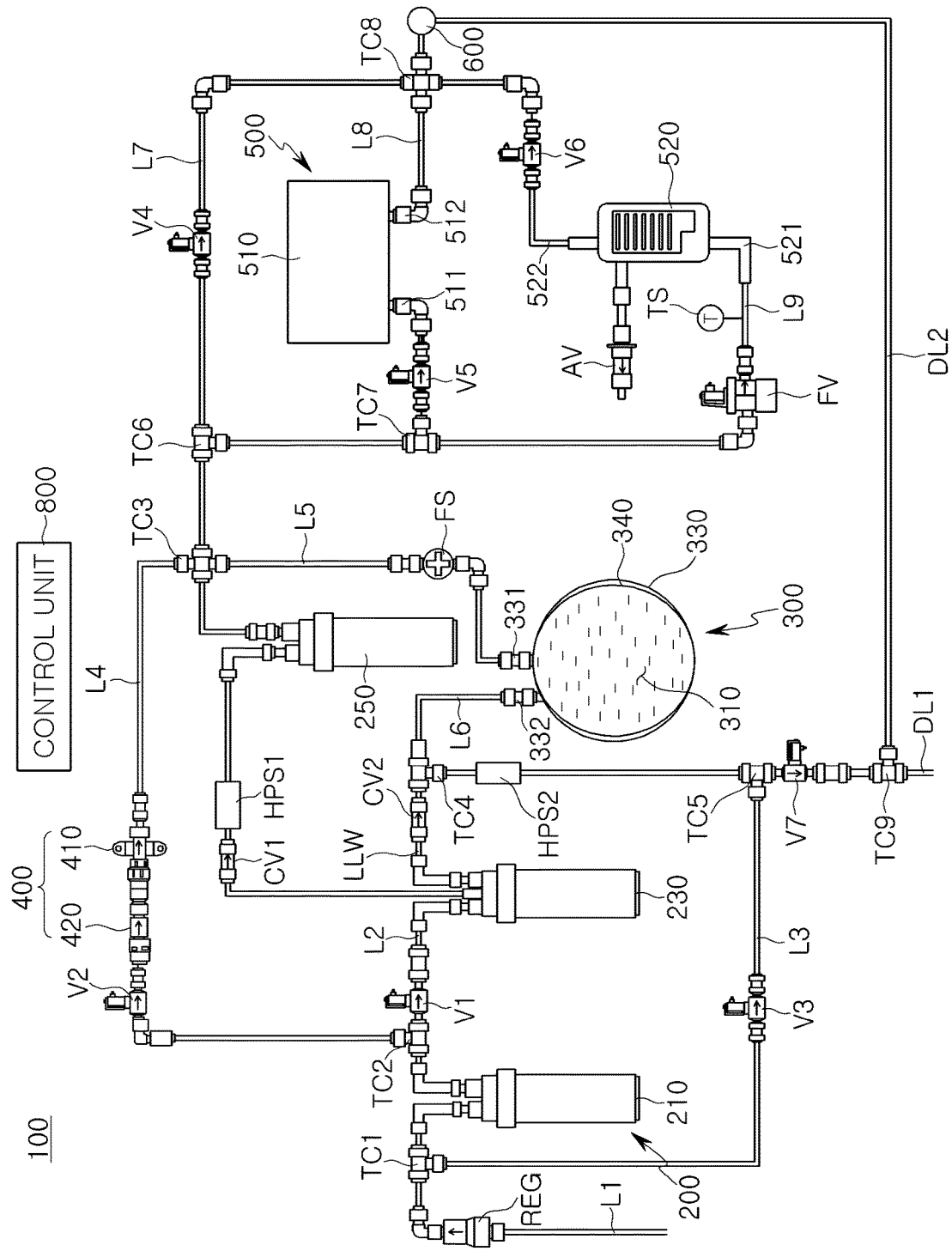
FIG. 3 is a water pipe diagram illustrating a state at the time of fully storing purified water of a water treatment device illustrated in FIG. 1.

A first high pressure shut-off switch HPS1 for outputting a signal when the pressure is equal to or higher than a predetermined pressure may be provided on a channel connecting the reverse osmosis filter 230 and the first chamber 310 of the storage unit 300, for example, a filtering unit line L2. As illustrated in FIG. 3, when the first chamber 310 of the storage unit 300 is full of water, and no more purified water is supplied, the pressure of raw water may be applied to the filtering unit line L2, and the first high pressure shut-off switch HPS1 may generate a signal. The control unit may shut off the supply of purified water according to the signal of the first high pressure shut-off switch HPS1, for example, may close the purified water supply valve V1.

A backflow prevention valve CV1 may be provided in a line connecting the reverse osmosis filter 230 and the first chamber 310 of the storage unit 300, for example, the filtering unit line L2. The backflow prevention valve CV1 may prevent sterilizing water generated by the sterilizing water supply unit 400 from flowing back to the reverse osmosis filter 230 as described later. In particular, since the reverse osmosis filter 230 may be susceptible to sterilizing water, the backflow prevention valve CV1 may be preferably installed at a rear end of the reverse osmosis filter 230. Further, a position thereof is not limited to that illustrated in FIG. 1, and may be installed in the filtering unit line L2 at a rear end of the post-treatment filter 250.

A flow rate sensor FS may be installed in the purified water supply line L5 connecting the filtering unit line L2 and the first chamber 310 of the storage unit 300. The flow rate sensor FS may sense a flow rate during a process of supplying purified water to the storage unit 300, as well as sensing a flow rate of extracted water when extracting purified water, particularly hot water, as will be described later. Accordingly, when the flow rate sensor FS does not detect flow rate in a state in which the purified water supply valve V1 is opened, it may be determined that the first chamber 310 of the storage unit 300 is full of water. Therefore, even in the case that an abnormality occurs in the first high pressure shut-off switch HPS1, the flow rate sensor FS may also control closing the filtering unit line L2, in a case in which the first chamber 310 is full of water. For example, the flow rate sensor FS may be used as a preliminary means of the first high pressure shut-off switch HPS1, and, if necessary, only the flow rate sensor FS may be installed without the first high pressure shut-off switch HPS1.

Meanwhile, the domestic water discharged from the domestic water discharge line LLW may be discharged externally by the drain water line DL1 via a chamber water flow line L6. The domestic water discharge line LLW and the chamber water flow line L6 may be connected by a first channel connection unit TC4 to discharge the domestic water.

In addition, a domestic water valve CV2, a channel resistance means, may be installed on the domestic water discharge line LLW side of the reverse osmosis filter 230 to control the discharge amount of domestic water.

[Storage Unit 300]

As illustrated in FIGS. 1 to 8, the storage unit 300 may include a first chamber 310 for storing filtered purified water through at least a portion of filters provided in the filtering unit 200, and a second chamber 320 of which volume changes according to volume change of the first chamber 310.

In particular, the storage unit 300 may include a housing 330 having an internal space formed therein for storing purified water in the filtering unit 200, and a partition member 340 dividing the internal space of the housing 330 into two chambers 320, and deformed according to volume changes of the first chamber 310 and the second chamber 320.

At this time, the partition member 340 may be deformed according to volume change of the first chamber 310 and the second chamber 320. Accordingly, a volume of the first chamber 310 may be changed according to volume change of the second chamber 320, and a volume of the second chamber 320 may be changed according to volume change of the first chamber 310.

The partition member 340 may have a balloon shape having an outlet port formed on one side thereof, and the housing 330 having a predetermined fixed volume may be formed to receive the partition member 340 therein.

An internal space of the partition member 340 may form the first chamber 310, and a space between the partition member 340 and the housing 330 may form the second chamber 320.

At this time, the partition member 340 may be made of a polyolefin elastomer. The polyolefin elastomer may be excellent in terms of elasticity and fatigue failure as compared with polyethylene, or the like. Accordingly, even in the case that the partition member 340 is repeatedly folded and unfolded by the inflow and outflow of water, breakage of the partition member 340 thereby may be significantly reduced, and durability of the partition member 340 may be improved. The material forming the partition member 340 is not limited thereto, and various materials, harmless to human bodies, such as polyethylene, or the like, may be applied.

The purified water supply line L5 may be connected to the first chamber 310 via a first chamber connection unit 331 to store purified water that has passed through the filter provided in the filtering unit 200. As the purified water is supplied to the first chamber 310, water contained in the second chamber 320 may be discharged externally.

In this case, the chamber water flow line L6 may be connected to the second chamber 320 via a second chamber connection unit 332. Further, as the purified water is supplied to the first chamber 310, water contained in the second chamber (hereinafter referred to as "chamber water") may be discharged externally by a drain line DL1 via the chamber water flow line L6, the first channel connection unit TC4 and the second channel connection unit TC5. At this time, the drain line DL1 and a drain connection line DL2, which will be described later, may be connected by a drain connection unit TC9. The drain line DL1 may be provided with a drain valve V7 that opens and closes for drain of water contained in the second chamber 320.

As water is supplied to the second chamber 320, the purified water stored in the first chamber 310 may be discharged to the extraction unit 600.

In particular, purified water contained in the first chamber 310 may be discharged to the extraction unit 600 via the purified water supply line L5 and a purified water extraction line L7. Although not shown in the figures, additional filters may be installed in a channel between the storage unit 300 and the extraction unit 600 to further filter purified water stored in the first chamber 310 of the storage unit 300. In a different manner to illustrated in FIG. 1, the post-treatment filter 250 may be installed in a channel at the downstream end of the purified water supply line L5, for example, in a channel between a channel branching unit TC3 and a purified water branching unit TC6, after the purified water filtered through the reverse osmosis filter 230 is stored in the first chamber 310 of the storage unit 300, but before the purified water discharged from the first chamber 310 is extracted. As above, purified water may be supplied through all of the filters 210, 230, and 250 provided in the filtering unit 200, as illustrated in FIG. 1. The water filtered by a portion of the filters may flow into and stored in the first chamber 310, and then the filtered water may be filtered once again at the time of discharging.

In the meantime, the second chamber 320 may be supplied with raw water, or water (chamber water) filtered from a portion of filters provided in the filtering unit 200, to discharge the water stored in the first chamber 310.

To this end, a chamber water supply line L3 branched from the raw water line L1 or the filtering unit line L2 may be provided. FIG. 1 shows a configuration in which the chamber water supply line L3 is branched from the raw water branching unit TC1 between the raw water line L1 and the pretreatment filter 210, such that raw water is supplied to the chamber water supply line L3. The filtered water may be supplied to the chamber water supply line L3 through a portion of the filters provided in the filtering unit 200, such as the pretreatment filter 210. In this case, the chamber water supply line L3 may be branched in the filtering unit line L2 at a rear end of the pretreatment filter 210.

The chamber water supply line L3 may be connected to the second chamber 320 via the chamber water flow line L6.

The chamber water supply line L3 may be provided with a chamber water supply valve V3 opened to supply water to the second chamber 320, and a second channel connection unit TC5 may be provided at a branch point of the chamber water supply line L3, the chamber flow line L6 and the drain line DL1.

In this way, raw water, or water filtered from the filter located a front stage of the reverse osmosis filter 230 may flow into the second chamber 320, such that water having a filtration degree lower than that of the first chamber 310 may flow into the second chamber 320.

On the other hand, when both the purified water supply valve V1 and the chamber water supply valve V3 are opened and the drain valve V7 is closed at the time of extracting the purified water, domestic water of the reverse osmosis filter 230 may be supplied to the second chamber 320, together with water flowed into the chamber water supply line L3.

A second high pressure shut-off switch HPS2 may be installed in the chamber flow line L6 (a channel connecting the second channel connection unit TC5, the first channel connection unit TC4, and the second chamber connection unit 332). The second high pressure shut-off switch HPS2 may outputs a signal when the pressure is equal to or higher than a predetermined pressure.

Specifically, as the chamber water is supplied to the second chamber 320, the first chamber 310 is emptied, such that the pressure applied to the second high pressure shut-off switch HPS2 continues to rise. Therefore, when the pressure of the chamber water flow line L6 is equal to or higher than a predetermined pressure, for example, when the pressure of raw water is applied to the chamber water flow line L6, the second high pressure shut-off switch HPS2 may outputs a signal, such that the control unit closes the chamber water supply valve V3 to shut off the supply of the chamber water to the second chamber 320.

[Sterilizing Water Supply Unit 400]

As illustrated in FIGS. 1 to 8, the sterilizing water supply unit 400 may be installed to sterilize at least one of the storage unit 300, the extraction unit 600, and a channel between the storage unit 300 and the extraction unit 600.

The sterilizing water supply unit 400 may be installed in a sterilizing water line L4 branched at the filtering unit line L2 provided in the filtering unit 200, such that water having passed through at least a portion of the filters provided in the filtering unit 200 may flow.

Referring to FIG. 1, the sterilizing water line L4 may be branched at a sterilizing water branching unit TC2 located at a rear end of the pretreatment filter 210 such that water filtered by passing through the pretreatment filter 210 is supplied to the sterilizing water supply unit 400.

At this time, the sterilizing water supply valve V2 may be provided in the sterilizing water line L4, and when the sterilizing water supply is required, the sterilizing water supply valve V2 may be opened by the control unit to generate sterilizing water.

The sterilizing water supply unit 400 may include a sterilizing water generating member 410 for generating sterilizing water by electrolytic sterilization, and a constant flow rate valve 420 for supplying water at a predetermined flow rate to the sterilizing water generating member 410. At this time, the sterilizing water generating member 410 and the constant flow rate valve 420 may be provided as an integrated module, but are not limited thereto.

The sterilizing water generating member 410 may be an electrolytic sterilizer that generates sterilizing water by electrolytic sterilization.

The electrolytic sterilizer may generate sterilizing water containing a sterilizing substance or a disinfecting substance (in the present specification, 'sterilizing water' means water capable of performing at least one of sterilizing and/or disinfecting functions) by applying power to electrodes.

As an example, the sterilizing water generating member 410 may electrolyze incoming water (herein, the term electrolyzing or electrolysis will be referred to as those including a 'redox reaction') to produce sterilizing water including materials having a sterilizing function and/or a cleaning function, such as an oxidizing mixed material (MO: Mixed Oxidant), or the like. The sterilizing water generating member 410 may sterilize or destroy microorganisms or bacteria remaining in water by passing water between the electrodes having different polarities. In general, sterilization of purified water by electrolysis may be proceeded with in a complicated process involving a direct oxidation reaction which directly oxidizes the microorganisms in the anode, and an indirect oxidation reaction which various mixed oxidants (MO: Mixed Oxidant), such as residual chlorine, ozone, OH radical, oxygen radical, or the like oxidize the microorganisms.

The electrolytic sterilizer described above may be preferably applied to the sterilizing water generating member 410 to supply sterilizing water at a uniform concentration. Other sterilizing water generators known in the art such as a sterilizer for generating sterilizing water by injecting chemicals are not intended to be excluded.

Meanwhile, sterilizing water generated by the sterilizing water supply unit 400 may be supplied to the storage unit 300 or the extraction unit 600 via the channel branching unit TC3 connected to the sterilizing water line L4.

For example, sterilizing water may be supplied to the first chamber 310 of the storage unit 300 via the channel branching unit TC3 and then the purified water supply line L5, and may be supplied to the extraction unit 600 via the channel branching unit TC3 and then the purified water extraction line L7. As described later, when the water temperature changing unit 500 is provided, sterilizing water may be supplied to the extraction unit 600 after passing through the cold water extraction line L8 and/or the hot water extraction line L9.

[Water Temperature Changing Unit (500)]

Meanwhile, the water treatment device 100 according to an aspect may be configured to supply only a constant temperature to a user via the purified water extraction line L7. The water temperature changing unit 500 may be provided to supply at least one of cold water and hot water to a user.

The water temperature changing unit 500 may include at least one of a cold water generating unit 510 installed in the cold water extraction line L8 for generating cold water, and a hot water generating unit 520 installed in the hot water extraction line L9 for generating hot water.

A similar channel structure as that of the extraction of the purified water may be provided to extract cold water. In this case, the cold water extraction valve V5 may be opened, and the purified water extraction valve V4 and the hot water extraction valve V6 may be shut off.

For example, since the cold water extraction valve V5 may be opened during the cold water extraction, the purified water discharged from the storage unit 300 via the purified water supply line L5 may flow to the cold water generating unit 510 via the purified water branching unit TC6. For this purpose, the cold/hot water branching unit TC7 may be provided between the cold water extraction line L8 and the purified water branching unit TC6. When the hot water generating unit 520 is not provided, the cold/hot water branching unit TC7 may not be provided.

The purified water received in the cold water generating unit 510 via the cold water receiving unit 511 may be cooled and discharged via the cold water discharging unit 512, and may be extracted by the extraction member 600 and supplied then to a user via the extraction branching unit TC8.

At this time, the cold water generating unit 510 may be a direct cold water tank having a predetermined volume to discharge the cold water cooled by the pressure of the inflow purified water. In this case, the purified water may flow into the cold water generating unit 510 by the pressure of raw water, and may be cooled and then discharged. Therefore, although the height of the extracting unit 600 is greater than the storage unit 300 and/or the cold water generating unit 510, the cold water may be extracted, whereby an installation height of the extraction unit 600 is not restricted. Further, although such a direct cold water tank may be preferably configured to be cooled by an electronic cooling device to reduce volume of driving means, cooling devices known in the art using a cooling cycle may not be excluded.

Meanwhile, a similar channel structure as that at the time of extracting the purified water may be provided to extract hot water. In this case, only the hot water extraction valve V6 may be opened, and the purified water extraction valve V4 and the cold water extraction valve V5 may be shut off.

For example, since the hot water extraction valve V6 is opened during hot water extraction, the purified water discharged from the storage unit 300 via the purified water supply line L5 may flows to the hot water generating unit 520 via the purified water branching unit TC6. To this end, the cold/hot water branching unit TC7 may be provided between the hot water extraction line L9 and the purified water branching unit TC6. When the cold water generating unit 510 is not provided, the cold/hot water branching unit TC7 may not be provided.

The purified water received by the hot water generating unit 520 via the hot water receiving unit 521 may be heated and discharged via the hot water discharging unit 522, and may be supplied to a user by the extraction unit 600 via the extraction branching unit TC8.

At this time, the hot water generating unit 520 may be a known instantaneous heating device used to instantaneously heat purified water passing through a channel formed therein. In this case, the purified water may flow into the hot water generating unit 520 by the pressure of raw water, and then heated and discharged. Therefore, although the height of the extracting unit 600 is greater than that of the storage unit 300 and/or the hot water generating unit 520, hot water may be extracted, whereby an installation height of the extraction unit 600 is not restricted.

The instantaneous heating device may be configured to control the heat generation of the heater to discharge hot water having a certain level of temperature. For this purpose, a temperature sensor TS for measuring the temperature of the purified water received in the hot water generating unit 520 may be provided. Further, a hot water receiving valve FV for regulating the flow of the purified water received in the hot water generating unit 520 may be installed. The hot water receiving valve FV may be constituted by a feed valve having a function of controlling a flow rate. FIGS. 1 to 8 show a configuration in which the hot water receiving valve FV and the temperature sensor TS are separately provided. The hot water receiving valve FV may be also modularized to perform both temperature sensing and flow rate control functions.

When the hot water generating unit 520 uses the instantaneous heating device, an air vent member AV for discharging steam generated in the hot water generating unit 520 may be installed.

[Extraction Unit 600]

The extraction unit 600 may be configured to provide a user with purified water stored in the storage unit 300, or cold water or hot water that has passed through the water temperature changing unit 500. The extraction unit 600 may include a cock or a faucet, and may include a mechanical or electronic extraction valve (not shown). Therefore, the extraction of purified water, cold water, or hot water may be performed as the user opens the extraction valve, and the extraction may be ended as the user closes the extraction valve.

In addition, sterilizing water may flow into the extraction unit 600 to sterilize the extraction unit 600. A drain connection line DL2 may be provided between the extraction unit 600 and the drain line DL1 such that water discharged from the extraction unit 600 is selectively discharged to the drain line DL1. At this time, a valve (not shown) or a discharging device for discharging sterilizing water may be provided in the drain connection line DL2 or the extraction unit 600.

The drain connection line DL2 may be used for drainage of the sterilizing water, but may be provided in the first chamber 310 when the first chamber 310 is required to be evacuated to clean the storage unit 300. After sterilization of the storage unit 300, the drain connection line may be used for drainage of rinsing water supplied to the first chamber 310.

In a different manner to an aspect shown in FIGS. 1 to 7 in which the drain connection line DL2 may be provided for discharging sterilizing water or the like, a separate drainage vessel 700 may be also used to receive sterilizing water discharged from the extraction unit 600, as illustrated in FIG. 8.

[Control Unit]

Finally, the control unit may control opening and closing of the channel such that a purification mode for storing purified water in the storage unit 300 and an extraction mode for extracting the purified water stored in the storage unit 300 via the extraction unit 600 are realized.

In addition, the control unit may control driving the sterilizing water supply unit 400, and opening and closing of the channel for supplying sterilizing water to implement a sterilization mode.

In particular, the control unit may control the opening and closing of the channel such that the sterilizing water generated by the sterilizing water supply unit 400 is supplied to the storage unit 300 in the sterilization mode of the storage unit, and the sterilizing water generated by the sterilizing water supply unit 400 is supplied to the extraction unit 600 in the sterilization mode of the extraction unit.

Further, the control unit may control the opening and closing of the channel such that the sterilizing water may be supplied to the channel connecting the storage unit 300 and the extraction unit 600 to sterilize the channel between the storage unit 300 and the extraction unit 600. For example, the control unit may be constituted that sterilizing water is supplied to the storage unit 300 in the sterilization mode of the storage unit, and the sterilizing water contained in the storage unit 300 is drained via the extraction unit 600, to sterilize and/or disinfect the channel between the storage unit 300 and the extraction unit 600.

When the water temperature changing unit 500 is provided, the control unit may control opening and closing the channel such that sterilizing water is supplied to at least one of the purified water extraction line L7, the cold water extraction line L8 and the hot water extraction line L9.

Specific operations of the control unit will be described with reference to specific channels of the purification mode, the extraction mode, and the sterilization mode.

[Channel of Purification Mode]

Referring to FIG. 2, the operation of the water treatment device 100 at the storage of purified water (purification mode) will be described. For convenience of explanation, the following description will be made on the basis of a valve that is maintained in an open state in the description of various modes, and other valves not described will be maintained in a closed state, unless otherwise specified.

The purified water may flow into the first chamber 310, when the purified water supply valve V1 is opened the extraction chamber 600 is closed, and the first chamber 310 of the storage unit 300 is not completely filled.

For example, since the purified water may flow into the first chamber 310 to apply the pressure less than a predetermined pressure to the first high pressure shut-off switch HPS1, the purified water supply valve V1 may be maintained in an open state.

The raw water flowed from the raw water line V1 may be decompressed to a certain level in the pressure reducing valve REG, may be filtered through the pretreatment filter 210, the reverse osmosis filter 230, and the post-treatment filter 250, which are installed in filtering unit line L2, and may be supplied to the first chamber 310 via the purified water supply line L5.

As the purified water is supplied to the first chamber 310, the volume of the second chamber 320 may be smaller, such that the chamber water contained in the second chamber 320 is discharged externally via the drain line DL1.

More specifically, in the purification mode, the drain valve V7 may be maintained in an open state, such that the chamber water contained in the second chamber 320 may be discharged externally via the chamber water flow line L6 and the drain line DL1.

The unfiltered domestic water in the reverse osmosis filter 230 may be discharged to the drain line DL1 via the domestic water discharge line LLW, the first channel connection unit TC4, the chamber water flow line L6, and the second channel connection unit TC5.

In this way, as the purified water is supplied to the first chamber 310, a volume of the first chamber 310 may continuously increase, and a volume of the second chamber 320 may decrease.

When this purification mode is continued, as illustrated in FIG. 3, the first chamber 310 may reach a full state of water.

In this case, since the purified water may no longer be supplied to the first chamber 310, the pressure of raw water (strictly, the pressure reduced by the pressure reducing valve) may be applied to the filtering unit line L2. The first high pressure shut-off switch may output a signal to the control unit when the pressure is equal to or higher than a predetermined pressure. The control unit may close the purified water supply valve V1 according to the signal of the first high pressure shut-off switch HPS1, such that the raw water does not flow into the filtering unit 200.

Meanwhile, in the present specification, the term 'full state of water' in the first chamber 310 may not be limited to a state in which the first chamber 310 is completely filled and the volume of the second chamber 320 is equal to 0 (zero). The term may mean that the first chamber 310 is full of water, when a pressure higher than a certain level is applied to the filter line L2 to output a signal of the first high pressure shut-off switch HPS1, or when the supply of purified water to the first chamber 310 is not performed due to the pressure of the filter line L2, even if the second chamber 320 has some space.

[Channel in the Extraction Mode]

Next, the operation of the water treatment device 100 at the time of extraction of purified water (extraction mode) will be described with reference to FIG. 4.

When the first chamber 310 of the storage unit 300 is filled with the purified water and the extraction unit 600 is in an open state, an extraction signal of the extraction unit 600 may be applied to the control unit.

Figure 4:
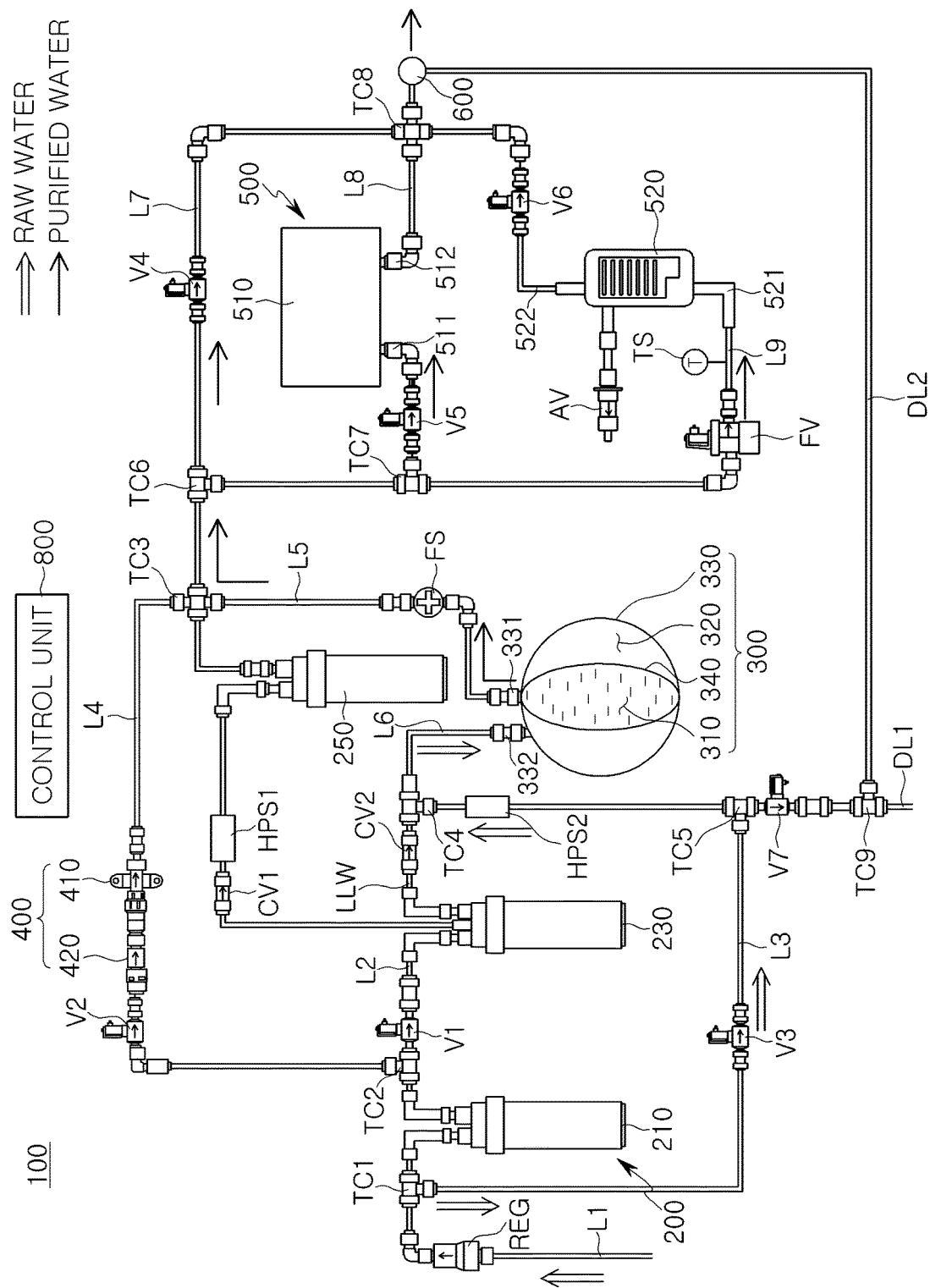
FIG. 4 is a water pipe diagram illustrating a channel at the time of extracting purified water of a water treatment device illustrated in FIG. 1.

In this case, as illustrated in FIG. 4, the chamber water supply valve V3 may be opened, and the raw water or the chamber water, which passes through a portion of the filters provided in the filtering unit 200, and has the degree of filtration higher than those of the purified water supplied to the first chamber 310, may flow into the second chamber 320 via the chamber water supply line L3 and the chamber water flow line L6.

As a result, the pressure of the second chamber 320 may be increased, the volume thereof may be increased, and the purified water of the first chamber 310 may be discharged.

Specifically, the purified water of the first chamber 310 may be provided to a user by the extraction unit 600 via the purified water supply line L5 and the channel branching unit TC3.

At this time, when the user selects the purified water at room temperature, the control unit may open the water extraction valve V4. In a case in which the cold water is taken, the control unit may open the cold water extraction valve V5. In a case in which the hot water is taken, the control unit may open the hot water extraction valve V6.

Therefore, the purified water may be extracted at a desired temperature to a user.

For example, when a user selects the cold water, the cold water cooled and stored in the cold water generating unit 510 may be discharged to the extraction unit 600 by the pressure of the chamber water supplied to the second chamber 320. When a user selects the hot water, an operation signal may be transferred to the hot water generating unit 520, and the hot water instantaneously heated by the hot water generating unit 520 may be discharged by the extraction unit 600. At this time, the control unit may control the amount of heat generated by the hot water generating unit 520, based on the detected flow rate of the flow rate sensor FS and the temperature value of the temperature sensor TS.

When a user continues to extract the purified water, the volume of the second chamber 320 may continue to increase, and accordingly, all of the purified water contained in the first chamber 310 may be discharged.

In this case, since the chamber water continues to flow into the chamber water flow line L6, the pressure higher than the predetermined value may be applied to the second high pressure shut-off switch HPS2 provided in the chamber water flow line L6. The signal generated by the shut-off switch HPS2 may be transmitted to the control unit.

The control unit may shut off the chamber water supply valve V3 by the signal of the second high pressure shut-off switch HPS2, finish the extraction mode, and perform the above-mentioned water purification mode.

When a user finishes the extraction even in a case of the state before the first chamber 310 is completely emptied, for example, before the signal of the second high-voltage shut-off switch HPS2 is generated, the control unit may finish the extraction mode, and may conduct the purification mode again.

On the other hand, although FIG. 4 shows a state in which the chamber water supply valve V3 is opened in the extraction mode, the purified water supply valve V1 together with the chamber water supply valve V3 may be opened.

In this case, the purified water stored in the first chamber 310 as well as the purified water filtered in the filtering unit 200 may be extracted together by the extraction unit 600. For example, the purified water filtered in the filtering unit 200 may be supplied to the extraction unit 600 by joining the purified water stored in the first chamber 310 and the channel branching unit TC3.

In addition, the domestic water not filtered by the reverse osmosis filter 230 may be discharged via the domestic water discharge line LLW. Since the drain valve V7 is in a closed state in the purified water extraction mode, the domestic water discharged via the domestic water discharge line LLW may be combined with the chamber water flows via the chamber water supply line L3 at the first channel connection unit TC4, and may flow into the second chamber 320 via the second chamber connection unit 332.

[Sterilization Mode 1—Sterilization Mode of Storage Unit]

Next, the sterilization mode of the storage unit will be described with reference to FIGS. 5 and 6.

When a user does not use the water treatment device 100 for a certain period of time, or a user selects the sterilizing and/or disinfecting unit, the storage unit may be sterilized and disinfected.

Figure 5:
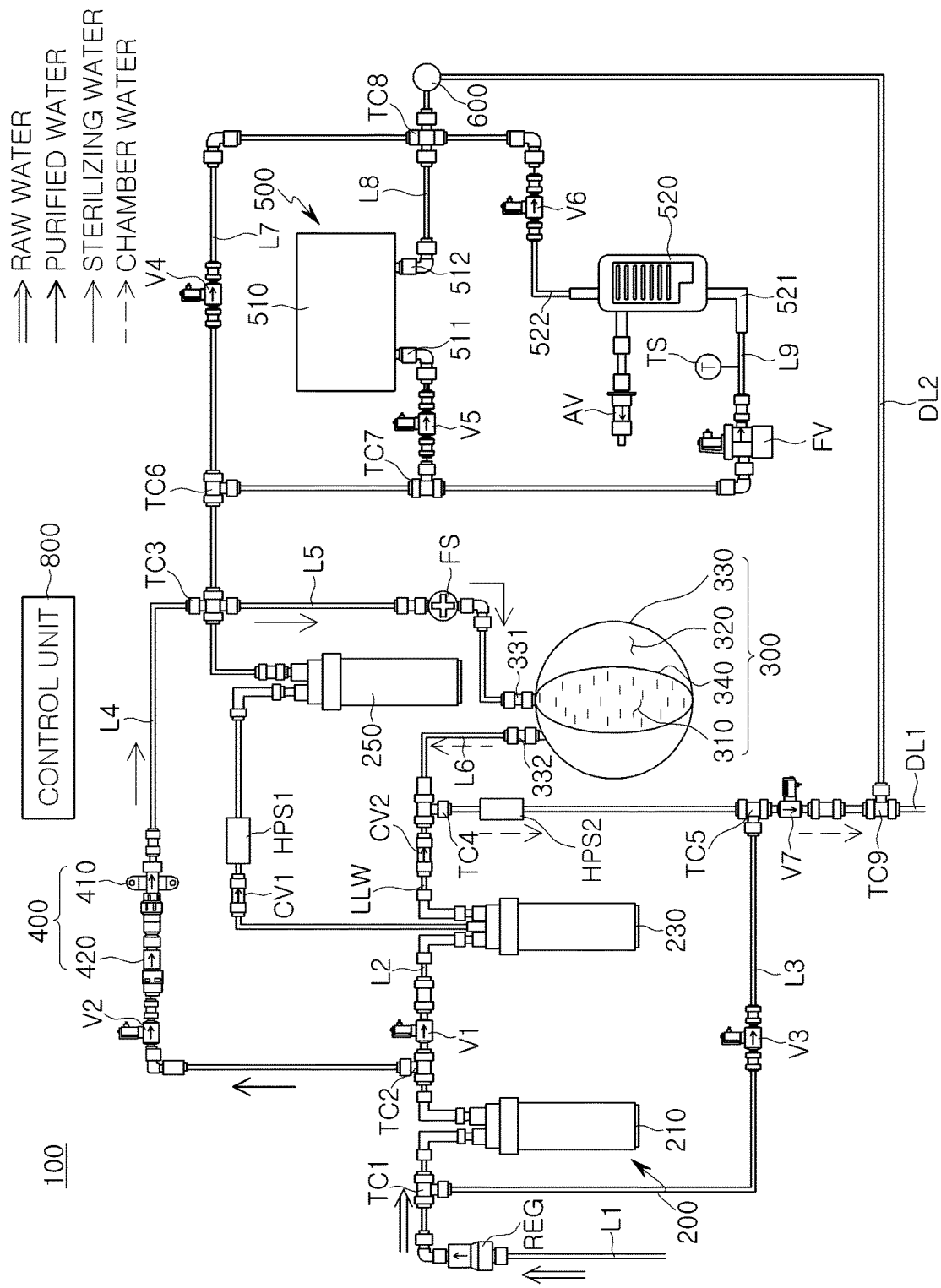
FIG. 5 is a water pipe diagram illustrating a channel at the time of disinfecting a tank of a water treatment device illustrated in FIG. 1.

Referring to FIG. 5, to perform the sterilization mode of the storage unit, the control unit may open the sterilizing water supply valve V2 to allow water to flow into the sterilizing water line L4.

Water supplied to the sterilizing water line L4 may be raw water. When an electrolytic sterilizer is used as the sterilizing water supply unit 400, the water filtered through at least some filters, for example, the pretreatment filter 210 may be preferably flowed to prevent foreign substances from flowing into the electrolytic sterilizer.

The water supplied to the sterilizing water line L4 may be sterilized by the sterilizing water generating member 410. The water passed through the constant flow valve 420 may be preferably flowed into the sterilizing water generating member 410 to control the concentration of sterilizing water constantly.

The sterilizing water generated in the sterilizing water generating member 410 may be supplied to the first chamber 310 via the channel branching unit TC3 and the purified water supply line L5.

To perform the sterilization mode of the storage unit, the water contained in the first chamber 310 of the storage unit 300 may be discharged before the sterilization mode may be performed, but is not limited thereto. For example, when sterilizing water may be supplied to the first chamber 310, and the total concentration (pH) of sterilizing water contained in the water in the first chamber 310 may be a certain level, the water of the first chamber 310 may be also partially discharged, before performing the sterilization mode of the storage unit.

When sterilizing water is supplied to the first chamber 310, the sterilizing water may be supplied until the first chamber 310 is full of water. The sterilizing water may be controlled to supply a certain amount of sterilizing water by time control or flow rate control using the flow rate sensor FS.

The sterilization mode of the storage unit may be the same as the water flow diagram of the purification mode, except that the sterilizing water is supplied to the first chamber 310 instead of the sterilizing water. For example, the discharge of the chamber water contained in the second chamber 320 may be the same as that in the purification mode, except that the sterilizing water may be supplied instead of the purified water to the first chamber 310. Therefore, the detailed description in this regard will be omitted.

When the sterilizing water filled in the first chamber 310 of the storage unit 300 is full of water, or when a certain amount of time has elapsed after being filled in a certain amount, the control unit may control the opening and closing of the channel to discharge the sterilizing water contained in the first chamber 310 via the extraction unit 600.

The channel in this case may be the same as the extraction mode, except that the water contained in the first chamber 310 may be sterilizing water rather than purified water, and, therefore, the explanation later will be focused on the difference from the extraction mode.

The sterilizing water in the first chamber 310 may be sent to the extraction unit 600 via the purified water supply line L5 and the purified water extraction line L7. At this time, since the backflow prevention valve CV1 is provided in the filtering unit line L2, it may be possible to prevent the sterilizing water from flowing back to the reverse osmosis filter 230. Therefore, it is possible to prevent the reverse osmosis filter 230 from being damaged by the sterilizing water.

The sterilizing water reaching the extraction unit 600 may be discharged externally via the drain connection line DL2 and the drain line DL1, connected to the extraction unit 600. A device such as a valve may be provided such that drainage of sterilizing water may be performed by the drain pipe DL2. Alternatively, as illustrated in FIG. 8, sterilizing water may be discharged by a separate drainage container 700 provided by a user.

As illustrated in FIG. 6, the sterilizing water discharged from the first chamber 310 may be discharged via a portion or all of the cold water extraction line L8 and the hot water extraction line L9 as well as the purified water extraction line L7. At least a portion of the purified water extraction line L7, the cold water extraction line L8 and the hot water extraction line L9 may be sequentially opened to flow sterilizing water into the respective lines in a sequential manner, but is not limited thereto. In addition, multiple lines may be also opened at the same time.

As described above, according to an aspect, the sterilization and/or disinfection of the channel between the storage unit 300 and the extraction unit 600, as well as the storage unit 300, may be advantageously performed by a series of continuous processes.

When the sterilization mode of the storage unit is finished, the purification mode may be performed again to fill the first chamber 310 with purified water.

On the other hand, although not shown in the drawing, a rinsing mode may be implemented to remove the sterilizing water remaining in the first chamber 310 after the storage sterilization mode, but before a re-purification process. To perform the rinsing mode, the purified water filtered through the filtering unit line L2, or the water supplied by the sterilizing water line L4 via only a portion of the filters of the filtering unit 200 (In this case, the sterilizing water generating unit may not be operated) may be supplied to the first chamber 310. The rinsing water may be supplied to the first chamber 310, until the first chamber 310 is full of water, or until a certain amount may be filled. After the rinsing water may be supplied, the operation of discharging the rinsing water may be performed, which may be the same as the channel illustrated in FIG. 6, and a detailed description thereof will be omitted.

[Sterilization Mode 2—Sterilization Mode of Extraction Unit]

Finally, referring to FIGS. 7 and 8, the sterilization mode of the extraction unit will be described.

As illustrated in FIGS. 7 and 8, the extraction unit 600 alone may be also separately sterilized.

The sterilizing water generated by the sterilizing water supply unit 400 may be discharged to the extraction unit 600 without passing through the storage unit 300.

For this purpose, in the sterilization mode of the extraction unit, the purified water extracting valve V4 may be opened to supply the sterilizing water to the extraction unit 600.

The cold water extraction valve V5 or the hot water extraction valve V6 may be also opened in the sterilization mode of the extraction unit. In this case, the cold water extraction line L8 or the hot water extraction line L9, as well as the cold water generating unit 510 and the hot water generating unit 520 may be sterilized and disinfected.

As illustrated in FIG. 7, the sterilizing water supplied to the extraction unit 600 may be drained to the drain line DL1 through the drain connection line DL2. Alternatively, as illustrated in FIG. 8, the drainage container 700 may be separately used in the drainage.

As described above, according to an aspect, since the sterilization and/or disinfection unit 600 may be performed separately from the sterilization and/or disinfection of the storage unit 300, the effect that sterilization and/or disinfection of the extraction unit 600 may be easily performed in a short time may be obtained.

Accordingly, the sterilization and/or disinfection of the extraction unit 600, which may be relatively easily contaminated, may be readily performed at predetermined intervals or by the user's selection.

While exemplary aspects have been shown and described above, it will be apparent to those skilled in the art that modifications and variations could be made without departing from the scope of the present disclosure as defined by the appended claims.

DESCRIPTION OF REFERENCE NUMERALS

100: water treatment device
200: filtering unit
210: pretreatment filter
230: main treatment filter
250: post-treatment filter
300: storage unit
310: first chamber
320: second chamber
330: housing
340: partition member
400: sterilizing water supply unit
410: sterilizing water generating member
420: constant flow rate valve
500: water temperature changing unit
510: cold water generating unit
511: cold water receiving unit
512: cold water discharging unit
520: hot water generating unit
521: hot water receiving unit
522: hot water discharging unit
600: extraction unit
AV: air vent member
CV1: backflow prevention valve
CV2: domestic water valve
DL1: drain line
DL2: drain connection line
HPS1: first high pressure shut-off switch
HPS2: second high pressure shut-off switch
FS: flow rate sensor
FV: hot water receiving valve
L1: raw water line
L2: filtering unit line
L3: chamber water supply line
L4: sterilizing water line
L5: purified water supply line
L6: chamber water flow line
L7: purified water extraction line
L8: cold water extraction line
L9: hot water extraction line
LLW: domestic water discharge line
REG: pressure reducing valve
TC1: raw water branching unit
TC2: sterilizing water branching unit
TC3: channel branching unit TC4: first channel connection unit
TC5: second channel connection unit
TC6: purified water branching unit
TC7: cold/hot water branching unit
TC8: extraction branching unit
TC9: drain connection unit
TS: temperature sensor
V1: purified water supply valve
V2: sterilizing water supply valve
V3: chamber water supply valve
V4: purified water extraction valve
V5: cold water extraction valve
V6: hot water extraction valve
V7: drain valve

The invention claimed is:

1. A water treatment device comprising:
a filtering unit for filtering raw water comprising one or more filters;
a storage unit comprising a first chamber for storing purified water, having passed through at least a portion of the one or more filters provided in the filtering unit and thus filtered, and a second chamber, a volume of which changes according to a volume change of the first chamber;
an extraction unit installed to provide a user with the purified water, having been filtered;
a sterilizing water supply unit for supplying sterilizing water to at least one of the storage unit and the extraction unit to sterilize at least one of the storage unit and the extraction unit; and
a control unit configured to control operating of the sterilizing water supplying unit and supplying the sterilizing water to at least one of the storage unit and the extraction unit,
wherein the sterilizing water supply unit is installed in a sterilizing water line branched from a filtering unit line provided in the filtering unit such that water having passed through at least a portion of the one or more filters provided in the filtering unit flows through the sterilizing water line,
wherein the filtering unit line is connected to the first chamber through a purified water supply line such that purified water filtered in the filtering unit flows into the first chamber, and
wherein the sterilizing water line is connected to the purified water supply line such that the sterilizing water generated by the sterilizing water supply unit flows into the first chamber.

2. The water treatment device according to claim 1, wherein the control unit is configured to supply sterilizing water to a channel provided between the storage unit and the extraction unit.

3. The water treatment device according to claim 2, wherein the control unit is configured to supply sterilizing water to the storage unit in a sterilization mode of the storage unit, and to drain sterilizing water contained in the storage unit through the extraction unit.

4. The water treatment device according to claim 1, wherein the purified water supply line is connected to the extraction unit, and a flow rate sensor is installed in the purified water supply line.

5. The water treatment device according to claim 1, further comprising:
at least one of a purified water extraction line for supplying purified water contained in the storage unit to the extraction unit at room temperature, a cold water extraction line for supplying cold purified water to the extraction unit, and a hot water extraction line for supplying hot purified water to the extraction unit,
wherein the cold purified water is generated by a cold water generating unit provided in the cold water extraction line, if present, and the hot purified water is generated by a hot water generating unit provided in the hot water extraction line f present, and
wherein the control unit supplies sterilizing water to at least one of the purified water extraction line, the cold water extraction line and the hot water extraction line, respectively, if present.

6. The water treatment device according to claim 1, wherein the control unit is configured to control storing the purified water in the storage unit in a purification mode and extracting the purified water stored in the storage unit through the extraction unit in an extraction mode.

7. The water treatment device according to claim 1, wherein the storage unit further comprises a housing having an internal space formed therein for storing the purified water filtered by the filtering unit and a compartment dividing the internal space of the housing into the first chamber and the second chamber, the compartment being deformed according to volume changes of the first chamber and the second chamber.

8. The water treatment device according to claim 1, wherein purified water filtered by passing through at least a portion of the filtering unit may flow into the first chamber, and raw water may flow into the second chamber through a chamber water supply line branched from a raw water line configured to supply raw water.

9. The water treatment device according to claim 1 comprising flow connects such that, wherein purified water filtered by passing through at least a portion of the filtering unit may flow into the first chamber, and water having a degree of filtration lower than that of the purified water supplied to the first chamber may flow into the second chamber through a chamber water supply line branched from the filtering unit line.

10. The water treatment device according to claim 1, wherein the filtering unit includes a reverse osmosis filter, purified water filtered by passing through the reverse osmosis filter flowing into the first chamber, and water filtered only by passing through a filter of the filtering unit which is upstream of the reverse osmosis filter, or unfiltered water, flowing into the second chamber.

11. The water treatment device according to claim 1, wherein the filtering unit comprises a reverse osmosis filter, and a backflow prevention valve is installed on a channel connecting the reverse osmosis filter and the first chamber of the storage unit.

12. The water treatment device according to claim 1, wherein the filtering unit comprises a reverse osmosis filter, a high pressure shut-off switch is installed on a channel connecting the reverse osmosis filter and the first chamber of the storage unit to output a signal, when the pressure is equal to or higher than a predetermined pressure.

13. The water treatment device according to claim 1, further comprising a chamber water supply line into which raw water or water filtered through at least a portion of the filter provided in the filtering unit flows towards the second chamber, a chamber water flow line connecting the chamber water supply line and the second chamber, and a drain line connected to the chamber water flow line such that water discharged through the chamber water flow line from the second chamber is discharged externally.

14. The water treatment device according to claim 13, wherein a high pressure shut-off switch for outputting a signal when the pressure is equal to or higher than a predetermined pressure is provided in the chamber water flow line.

15. The water treatment device according to claim 13, wherein the filtering unit includes a reverse osmosis filter, wherein domestic water discharged via the domestic water discharge line, which does not pass through the reverse osmosis filter, is discharged to the drain line via the chamber water flow line.

16. The water treatment device according to claim 13, wherein a drain connection line is installed between the extraction unit and the drain line such that water discharged from the extraction unit is selectively discharged to the drain line.

* * * * *